US012480965B2

(12) United States Patent
Tanada

(10) Patent No.: US 12,480,965 B2
(45) Date of Patent: Nov. 25, 2025

(54) SPECIMEN RACK TRANSFERRING DEVICE AND AUTOMATIC ANALYZER USING THE SAME

(71) Applicant: Hitachi High-Tech Corporation, Tokyo (JP)

(72) Inventor: Daisuke Tanada, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 551 days.

(21) Appl. No.: 18/017,816

(22) PCT Filed: Mar. 2, 2021

(86) PCT No.: PCT/JP2021/007997
§ 371 (c)(1),
(2) Date: Jan. 24, 2023

(87) PCT Pub. No.: WO2022/044382
PCT Pub. Date: Mar. 3, 2022

(65) Prior Publication Data
US 2023/0266351 A1 Aug. 24, 2023

(30) Foreign Application Priority Data

Aug. 27, 2020 (JP) ................................ 2020-143850

(51) Int. Cl.
*G01N 35/04* (2006.01)
*B01L 9/06* (2006.01)
(52) U.S. Cl.
CPC ............... *G01N 35/04* (2013.01); *B01L 9/06* (2013.01); *G01N 2035/0413* (2013.01); *G01N 2035/046* (2013.01)
(58) Field of Classification Search
CPC ........... G01N 35/04; G01N 2035/0413; G01N 2035/046; B01L 9/06
See application file for complete search history.

(56) References Cited

U.S. PATENT DOCUMENTS

| 5,356,595 A | 10/1994 | Kanamori et al. |
| 2003/0235514 A1 | 12/2003 | Nogawa et al. |

(Continued)

FOREIGN PATENT DOCUMENTS

| CN | 104991080 A | 10/2015 |
| JP | 3-94159 A | 4/1991 |

(Continued)

OTHER PUBLICATIONS

International Preliminary Report on Patentability (PCT/IB/338 & PCT/IB/373) issued in PCT Application No. PCT/JP2021/007997 dated Mar. 9, 2023, Including English translation of document C2 (Japanese-language Written Opinion (PCT/ISA/237), filed on Jan. 24, 2023) (six (6) pages).

(Continued)

*Primary Examiner* — John McGuirk
(74) *Attorney, Agent, or Firm* — Crowell & Moring LLP

(57) ABSTRACT

A specimen rack transferring device and an automatic analyzer using it are provided which can suppress vibration during transportation of a specimen rack.

In a specimen rack transferring device 200 transferring a specimen rack 4 which places a plurality of specimen containers 5 accommodating specimens, in a side-by-side manner in a longitudinal direction and can carry the plurality of specimen containers, the specimen rack transferring device includes a transport path 201 for transferring the specimen rack 4 in a direction orthogonal to the longitudinal direction, a transport arm 6 pushingly advancing the specimen rack 4 from an upstream side toward a downstream side of the transport path 201, and a rack lock mechanism provided at the transport arm 6 and fixing at least a relative position of the specimen rack 4 in a transport direction with respect to the transport arm 6.

7 Claims, 10 Drawing Sheets

(56) References Cited

U.S. PATENT DOCUMENTS

| | | |
|---|---|---|
| 2010/0166606 A1 | 7/2010 | Koike et al. |
| 2011/0236165 A1* | 9/2011 | Kaiga .................. G01N 35/026 414/222.07 |
| 2015/0160249 A1 | 6/2015 | Bucher et al. |
| 2019/0033334 A1 | 1/2019 | Abe et al. |

FOREIGN PATENT DOCUMENTS

| | | | |
|---|---|---|---|
| JP | 6-337268 A | 12/1994 | |
| JP | 2000-266762 A | 9/2000 | |
| JP | 2003-344423 A | 12/2003 | |
| JP | 2010-156624 A | 7/2010 | |
| JP | 2015-114329 A | 6/2015 | |
| WO | WO-2015121919 A1 * | 8/2015 | ............. G01N 35/04 |
| WO | WO 2017/110486 A1 | 6/2017 | |

OTHER PUBLICATIONS

International Search Report (PCT/ISA/210) issued in PCT Application No. PCT/JP2021/007997 dated May 18, 2021 with English translation (eight (8) pages).

Japanese-language Written Opinion (PCT/ISA/237) issued in PCT Application No. PCT/JP2021/007997 dated May 18, 2021 (four (4) pages).

* cited by examiner

SPECIMEN RACK TRANSFERRING DEVICE AND AUTOMATIC ANALYZER USING THE SAME

TECHNICAL FIELD

The present invention relates to a specimen rack transferring device and an automatic analyzer using the same.

BACKGROUND ART

The automatic analyzer is a device for qualitative or quantitative analysis of a specific component contained in a biological sample such as blood, urine and cerebrospinal fluid. The automatic analyzer is indispensable for facilities such as hospitals and medical inspection facilities required to process a large number of specimens of patients in a short time.

The automatic analyzer of the above-described type is configured to transport a plurality of specimen containers each storing the specimen to be analyzed, which are mounted on a specimen rack. Patent Literature 1 discloses the tube rack transferring device for transferring the tube rack, which has been applied as the technology relating to transport of the specimen rack. The tube rack transferring device includes a first rail extending in a first horizontal direction, and a second rail extending in a second horizontal direction orthogonal to the first horizontal direction. The second rail is movable along the first rail, and includes at least one transfer head which is movable along the second rail. The transfer head includes at least one control pin to be connected to at least one of a loading pusher, an unloading pusher, and a tube rack. The loading pusher moves translationally in the second horizontal direction for transferring the tube rack from the rack carrier to the sampling region of the diagnosis device. The unloading pusher transfers the tube rack from the sampling region of the diagnosis device to the rack carrier. The tube rack is transferred between different rack carriers and/or between different positions of the same rack carrier.

CITATION LIST

Patent Literature

Patent Literature 1: Japanese Unexamined Patent Application Publication No. 2015-114329

SUMMARY OF INVENTION

Technical Problem

In the generally employed art, the specimen rack having a plurality of specimen containers arranged in the longitudinal direction is pushingly advanced by the transport arm which moves in the direction orthogonal to the longitudinal direction. When only one specimen rack is set on the rack tray, the reaction caused by the contact between the specimen rack and the transport arm may vibrate the specimen rack in the moving direction of the transport arm. In the generally employed art, the T-shaped recess portion is formed at the lower part of the specimen rack for the fall prevention purpose. The recess portion is engaged with the guide rail provided on the transport path of the specimen rack along the transport arm operation direction to prevent the specimen rack from falling. The engaged part between the guide rail and the T-shaped recess portion at the lower part of the specimen rack has an appropriate gap not to interfere with the sliding operation of the specimen rack. Accordingly, the engagement between the guide rail and the T-shaped recess portion cannot prevent the specimen rack from vibrating.

In view of the above-described circumstances, it is an object of the present invention to provide the specimen rack transferring device which allows suppression of vibration of the specimen rack in the transport process, and to further provide the automatic analyzer using the specimen rack transferring device.

Solution to Problem

An example of the present invention which proposes a plurality of solutions of the problem will be described below. The specimen rack transferring device transfers a specimen rack which places a plurality of specimen containers accommodating specimens, in a side-by-side manner in a longitudinal direction and can carry the plurality of specimen containers. The specimen rack transferring device includes a transport path for transferring the specimen rack in a direction orthogonal to the longitudinal direction, a transport arm pushingly advancing the specimen rack from an upstream side to a downstream side of the transport path, and a rack lock mechanism provided at the transport arm and fixing at least a relative position of the specimen rack in a transport direction with respect to the transport arm.

Advantageous Effects of Invention

The present invention attains suppression of the vibration of the specimen rack in the transport process.

DESCRIPTION OF EMBODIMENTS

Figure 1:
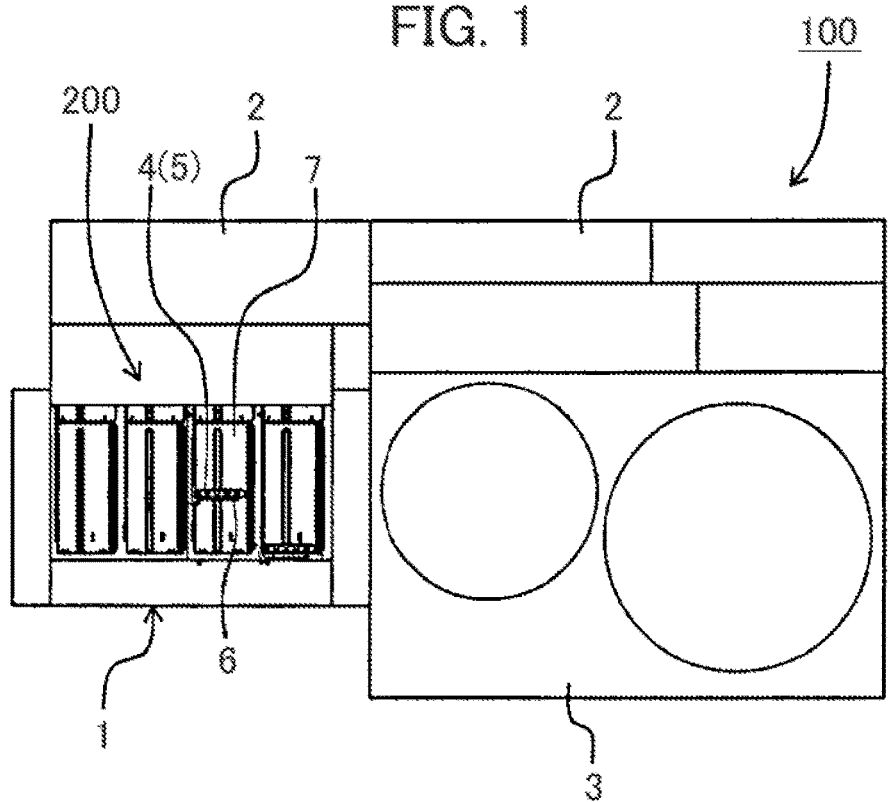
FIG. 1 is a plan view schematically showing an entire configuration of an automatic analyzer.

Embodiments according to the present invention will be described referring to the drawings.

First Embodiment

A first embodiment of the present invention will be described referring to FIG. 1 to FIG. 14.

FIG. 1 is a plan view schematically showing an entire configuration of an automatic analyzer according to the embodiment.

As FIG. 1 illustrates, an automatic analyzer 100 includes a specimen rack loading section 1 for loading a specimen rack 4 on which specimen containers 5 each storing the specimen are mounted, a specimen rack transporting section 2 for transporting the specimen rack 4 from the specimen lack loading section 1 to an analyzing section 3, and a specimen rack transferring device 200 provided for the specimen rack loading section 1, which transfers the specimen rack 4 loaded therein to the specimen rack transporting section 2.

The specimen rack 4 which accommodates and holds one or more specimen containers 5 each storing the specimen is set on a rack tray 7, and placed on the specimen rack loading section 1. The specimen rack 4 loaded onto the specimen rack loading section 1 is pushingly advanced by a transport arm 6 of the specimen rack transferring device 200, and transferred to the specimen rack transferring device 2. The specimen rack transferring device 2 places the specimen rack 4 at a predetermined position on the analyzing section 3. The analyzing section 3 aspires the specimen such as a biological sample from the specimen container 5 held by the specimen rack 4 for analytical use.

The rack tray 7 is detachably provided on the specimen rack loading section 1. One or more specimen racks 4 are set on the rack tray 7 detached from the specimen rack loading section 1. The rack tray 7 which has accommodated the specimen rack 4 is set at the predetermined position on the specimen rack loading section 1 to load the specimen rack 4 thereon. One or more specimen racks 4 may be set on the rack tray 7. The plurality of specimen racks 4 to be loaded may be arranged in close contact with one another, or at intervals from one another.

Figure 2:
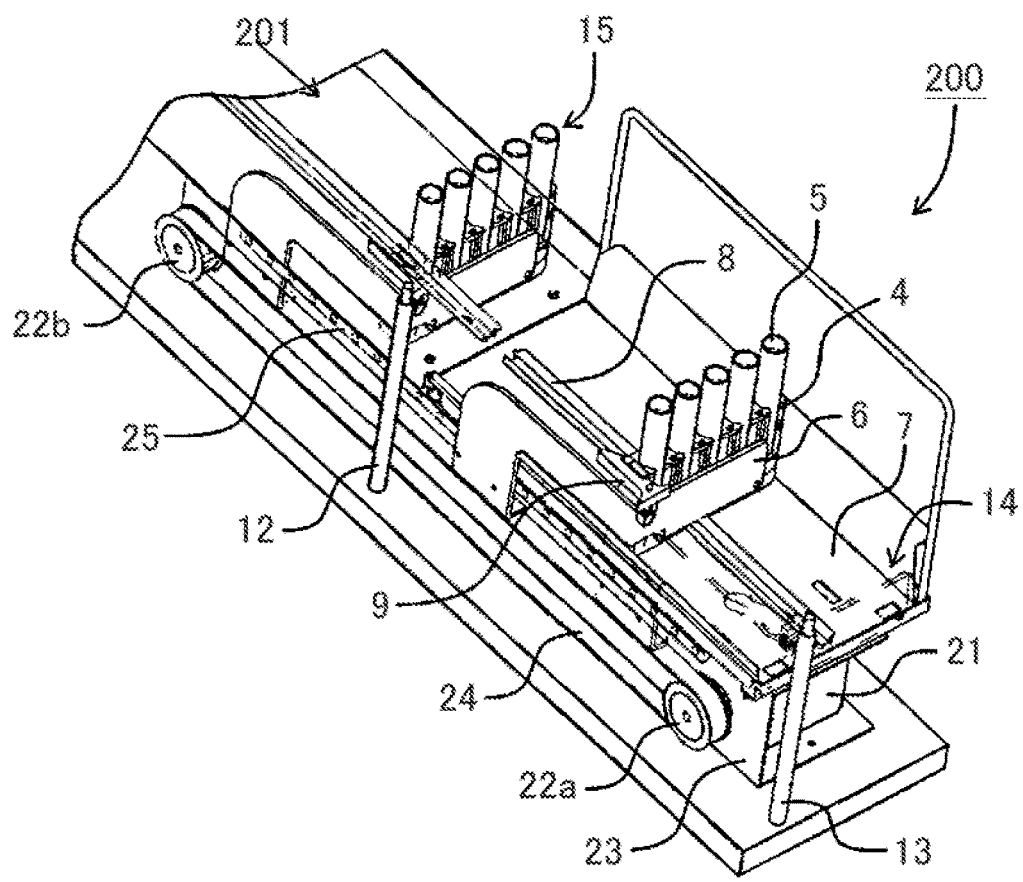
FIG. 2 is a perspective view showing by extracting a specimen rack transferring device according to a first embodiment.

FIG. 2 is a perspective view of an extracted specimen rack transferring device according to the embodiment. FIG. 2 illustrates the state of the specimen rack in the transport process.

Referring to FIG. 2, the specimen rack transferring device 200 transfers the specimen rack 4 which allows loading of one or more specimen containers 5 each containing the specimen in an arrangement in the longitudinal direction. The specimen rack transferring device includes a transport path 201 for transferring the specimen rack 4 in the direction orthogonal to the longitudinal direction, a transport arm 6 which pushingly advances the specimen rack 4 from the upstream side to the downstream side of the transport path 201, and a rack lock mechanism attached to the transport arm 6 for fixing a relative position of the specimen rack 4 to the transport arm 6 at least in the transport direction.

The transport arm 6 moves from a transport operation-starting position 14 indicated by a two-dotted chain line to a transport-ending position 15 to pushingly advance the specimen rack on the transport path 201 in the direction orthogonal to the one in which the specimen containers 5 are arranged in the longitudinal direction of the specimen rack 4 (that is, the direction orthogonal to the longitudinal direction). The specimen rack 4 set on the rack tray 7 is pushed by the transport arm 6 to be loaded into the device (specimen rack transporting section 2) from the rack tray 7.

The rack tray 7 includes a guide rail 8 placed thereon while extending along the operation direction of the transport arm 6. The guide rail 8 has a T-shaped cross section which is slidably engaged with a T-shaped recess portion 16 formed in the lower section of the specimen rack 4 for fall prevention purpose. This prevents the specimen rack 4 from falling.

The specimen rack transferring device 200 on a structural member 23 includes a motor 21 for moving the transport arm 6 to the transport direction of the specimen rack 4, pulleys 22a, 22b disposed at ends in the upstream side and the downstream side of the transport path 201, respectively, a belt 24 wound between the pulleys 22a and 22b, and a guide member 25 for guiding the movement of the transport arm 6. The transport arm 6 is guided by the guide member 25 to be movable in the transport direction of the specimen rack 4 while having the posture held with respect to the transport path 201. The transport arm 6 is fixed to the belt 24. The motor 21 for rotatably driving the pulley 22a allows the transport arm 6 to move in the transport direction of the specimen rack 4.

Figure 3:
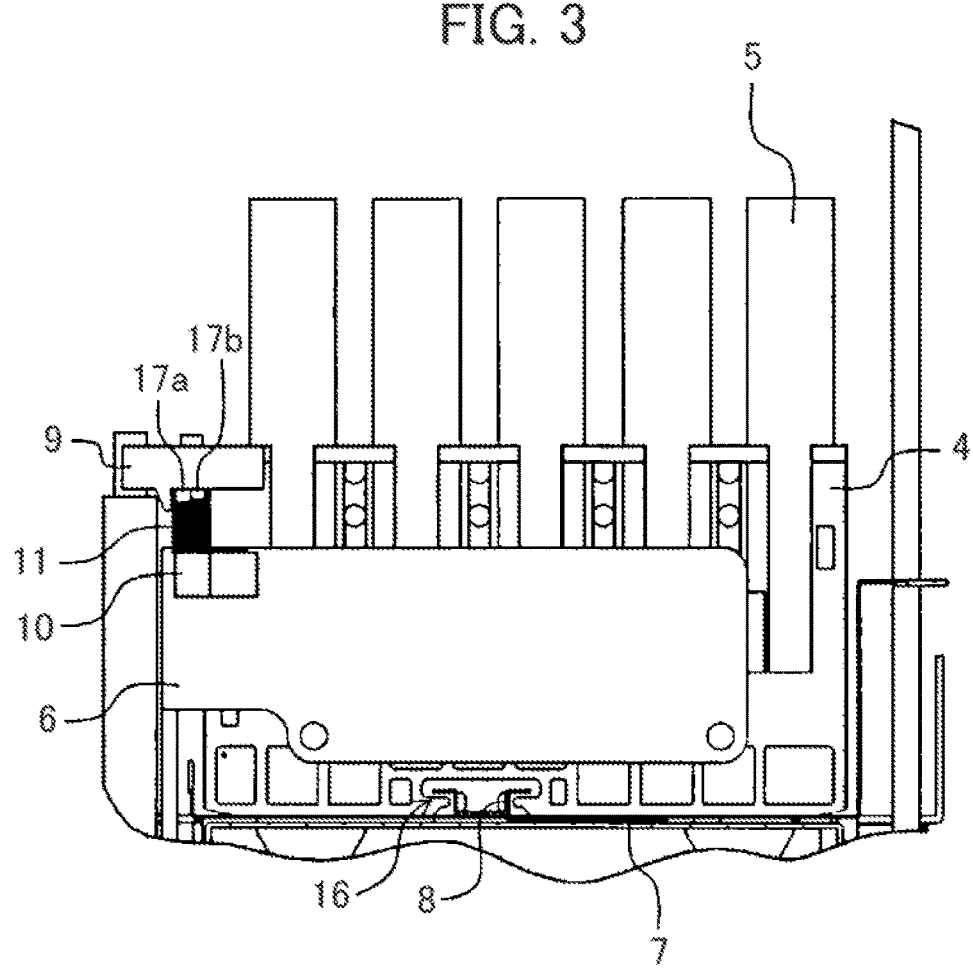
FIG. 3 is a side view showing by extracting a transport arm together with a peripheral configuration and is a view in viewing the transport arm from an upstream side of a transport path.
Figure 4:
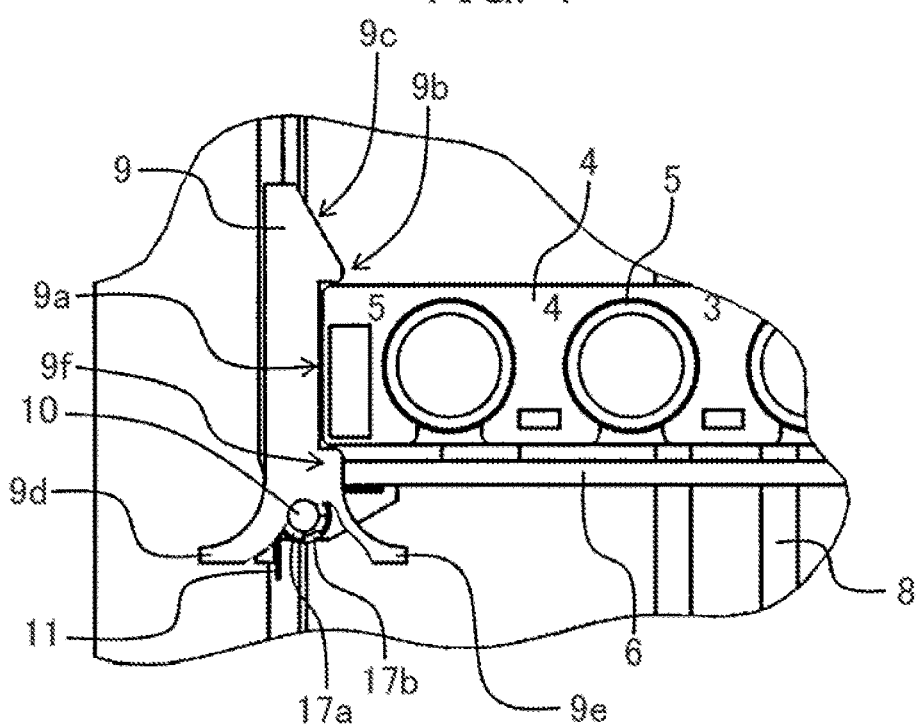
FIG. 4 is a plan view enlargingly showing by extracting a rack lock mechanism provided at the transport arm and is a partial perspective view showing a part of a rack lock member as a perspective view.

FIG. 3 is a side view of an extracted transport arm and its periphery when the transport arm is viewed from the upstream side of the transport path. FIG. 4 is a plan view of an enlarged part of an extracted rack lock mechanism attached to the transport arm as a partial perspective view of a rack lock member 9.

As FIG. 3 and FIG. 4 illustrate, the rack lock mechanism includes the rack lock member 9 placed at an end of the specimen rack 4 in the longitudinal direction while extending along the transport path, and a base member 10 which rotatably holds an upstream end of the rack lock member 9 with respect to the transport arm 6 in the horizontal direction. The base member 10 holds the rack lock member 9 at a position close to the upper end of the specimen rack 4.

The rack lock member 9 has a recess portion in the side surface that faces the specimen rack 4. The recess portion of the rack lock member 9 includes a structural portion 9a as the deepest section of the recess portion, which faces the end of the specimen rack 4, a structural portion 9b which extends from the downstream end of the structural portion 9a along the downstream side surface of the specimen rack 4, and a structural portion of which extends from the upstream end of the structural portion 9a along the upstream side surface of the specimen rack 4.

The rack lock member 9 is urged by an elastic body 11 clockwise around a rotary shaft of the base member 10 as the center when viewed from above. Accordingly, the longitudinal end of the specimen rack 4 is engaged with the recess portion of the rack lock member 9 at the position close to the upper end of the specimen rack 4. The structural portion 9f of the recess portion of the rack lock member 9 holds the upstream side surface of the specimen rack 4, and the structural portion 9b of the recess portion of the rack lock member 9 holds the downstream side surface of the specimen rack 4. This brings the relative position of the specimen rack 4 to the transport arm 6 into a fixed state (locked state) to prevent the specimen rack 4 from vibrating in the transport direction. The structural portion 9a of the recess portion of the rack lock member 9 holds the end of the specimen rack 4. This is expectable for improving stability in transportation of the specimen rack 4, that is, improving the effect of preventing the vibration of the specimen rack 4 in the transport process.

The rack lock member 9 and the base member 10 are provided with stopper structures 17a, 17b which are in contact with each other. The rack lock member 9 urged by the elastic body 11 (torsion spring) clockwise when viewed from above has its rotation regulated by the contact with the stopper structures 17a, 17b at the specific position. In the embodiment, the stopper structures 17a, 17b regulate the rotation of the rack lock member 9 so as not to protrude to the transport path side from the position as indicated by FIG. 4.

The rack lock member 9 includes a structural portion 9c which is continuously formed from an end of the structural portion 9b at the side opposite the structural portion 9a toward a downstream end of the rack lock member 9.

When the transport arm 6 approaches the specimen rack 4 from the position separated from the upstream side of the specimen rack 4, the structural portion 9c of the rack lock member 9 comes in contact with the longitudinal end of the specimen rack 4. Accompanied by the movement of the transport arm 6 to the downstream side, the structural portion 9c slides on the end of the specimen rack 4. The rack lock member 9 is then rotated counterclockwise around the rotary shaft as the center. When the transport arm 6 reaches the position which abuts on the specimen rack 4, the structural portion 9b of the recess portion of the rack lock member 9 passes over the end of the specimen rack 4. Accordingly, the longitudinal end of the specimen rack 4 is engaged with the recess portion of the rack lock member 9. That is, the rack lock mechanism is brought into the locked state where the relative position of the specimen rack 4 to the transport arm 6 is fixed under the force generated between the transport arm 6 and the specimen rack 4 accompanied by the movement of the transport arm 6.

The rack lock member 9 includes a structural portions 9e and 9d in the upstream side of the rotary shaft. The structural portion 9e protrudes to the transport path side, and the structural portion 9d protrudes to the direction opposite to the transport path.

When applying the force larger than the urging force of the elastic body 11 from the downstream side of the structural portion 9d, the rack lock member 9 is rotated counterclockwise around the rotary shaft as the center to release the engagement between the rack lock member 9 and the specimen rack 4. The relative position of the specimen rack 4 to the transport arm 6 is brought into a non-fixed state (released state). Similarly, when applying the force larger than the urging force of the elastic body 11 from the upstream side of the structural portion 9e, the rack lock member 9 is rotated counterclockwise around the rotary shaft as the center to release the engagement between the rack lock member 9 and the specimen rack 4. The relative position of the specimen rack 4 to the transport arm 6 is brought into a non-fixed state (released state).

In the embodiment, the elastic body 11 exemplified by the torsion spring urges the rack lock member 9 to the direction of the specimen rack 4. Alternatively, the elastic body 11 in the form other than the torsion spring, for example, a compression spring, a pull spring, or a rubber may be used to urge the rack lock member 9.

Operations of the above-configured specimen rack transferring device 200 will be described.

FIG. 5 to FIG. 9 are diagrams illustrating the rack lock mechanism in the process of operation accompanied by the movement of the transport arm.

Figure 5:
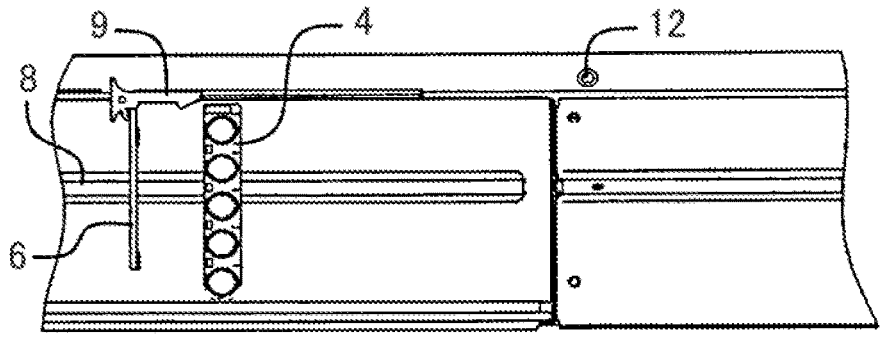
FIG. 5 is a diagram showing an operating process of the rack lock mechanism due to movement of the transport arm.

As FIG. 5 illustrates, when the transport arm 6 is positioned separated from the upstream side of the specimen rack 4, the stoper structures 17a, 17b work to regulate the rotation of the rack lock member 9 at the specific position (position as shown in FIG. 4), and the structural portion 9a of the recess portion of the rack lock member 9 is located at the position corresponding to the end of the specimen rack 4.

Figure 6:
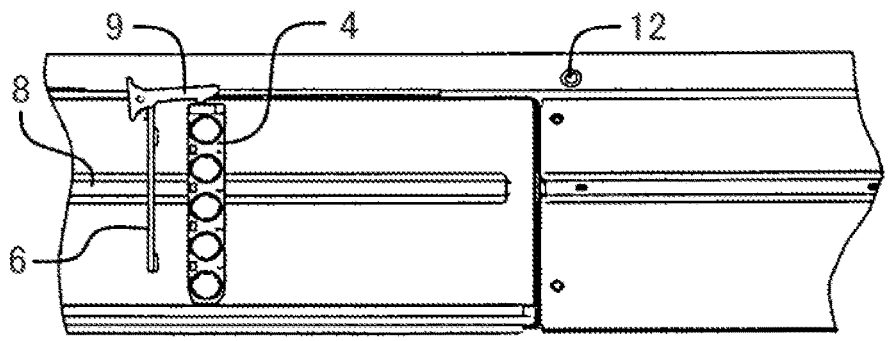
FIG. 6 is a diagram showing the operating process of the rack lock mechanism due to the movement of the transfer arm.

As FIG. 6 illustrates, when the transport arm 6 approaches the specimen rack 4 from the upstream side, the wedge-shaped structural portion 9c formed at the downstream end of the rack lock member 9 comes in contact with the specimen rack 4. The rack lock member 9 is then rotated counterclockwise around the rotary shaft as the center. The transport arm 6 moves to the downstream side while having the structural portion 9c sliding on the end of the specimen rack 4.

Figure 7:
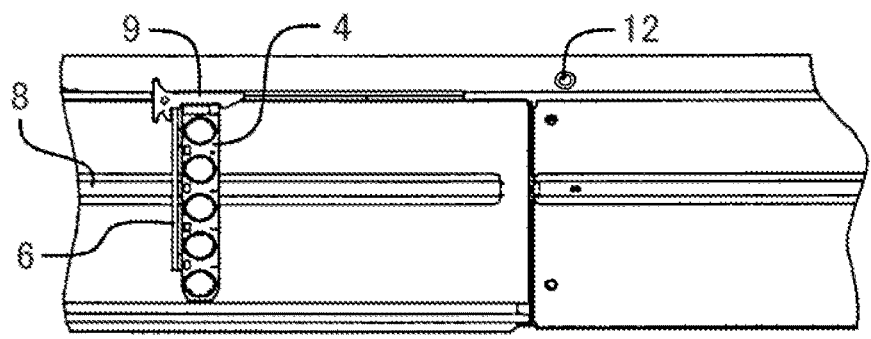
FIG. 7 is a diagram showing the operating process of the rack lock mechanism due to the movement of the transport arm.

Thereafter, as FIG. 7 illustrates, at a time point when the transport arm 6 reaches the upstream side surface of the specimen rack 4, the rack lock member 9 is rotated clockwise under the force of the elastic body 11 when viewed from above to engage the recess portion of the rack lock member 9 with the longitudinal end of the specimen rack 4.

Figure 8:
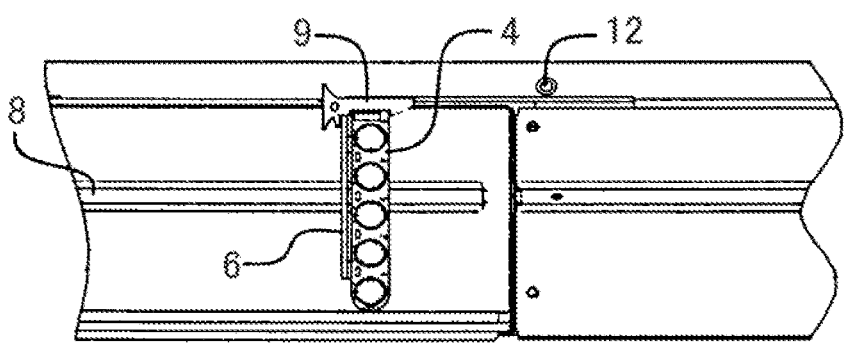
FIG. 8 is a diagram showing the operating process of the rack lock mechanism due to the movement of the transport arm.

Then, as FIG. 8 illustrates, the transport arm 6 and the specimen rack 4, which are held in the engaged state move to the direction of the transport-ending position 15.

Figure 9:
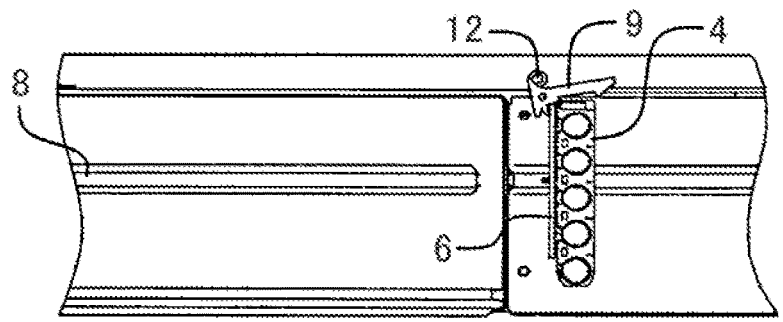
FIG. 9 is a diagram showing the operating process of the rack lock mechanism due to the movement of the transport arm.

Referring to FIG. 9, when the transport arm 6 has reached the transport-ending position 15, the structural portion 9d of the rack lock member 9 in the downstream side comes in contact with a lock releasing member 12, and is urged accompanied by the movement of the transport arm 6. The rack lock member 9 is then rotated counterclockwise when viewed from above to release the engagement between the recess portion and the specimen rack 4 (released state).

The structural portion 9*d* and the lock releasing member 12 are in contact with each other just before the transport arm 6 reaches the transport-ending position 15 so that the engagement between the rack lock member 9 and the specimen rack 4 is released. Accordingly, they are not engaged again by the movement of the transport arm 6 from the transport-ending position 15 to the transport operation-starting position 14. The specimen rack 4 may be transported to the specimen rack transporting section 2 before the transport arm 6 which has reached the transport-ending position 15 starts returning to the transport operation-starting position 14.

Figure 10:
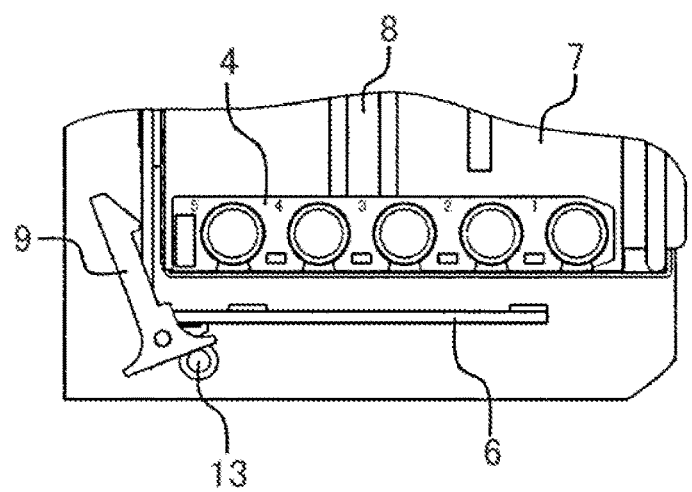
FIG. 10 is a plan view showing by extracting the transport arm at a transport operation-starting position, together with a peripheral configuration.

FIG. 10 is a plan view of an extracted part of the transport arm and its periphery at the transport operation-starting position.

As FIG. 10 illustrates, accompanied by the movement of the transport arm 6 up to the transport operation-starting position 14, the structural portion 9*e* of the rack lock member 9 in the upstream side comes in contact with an interference avoiding member 13 fixed to the device base, and is urged. The rack lock member 9 is then rotated counterclockwise when viewed from above to retract to the position which does not interfere with the flow line of the rack tray 7 in the attachment/detachment process.

Figure 11:
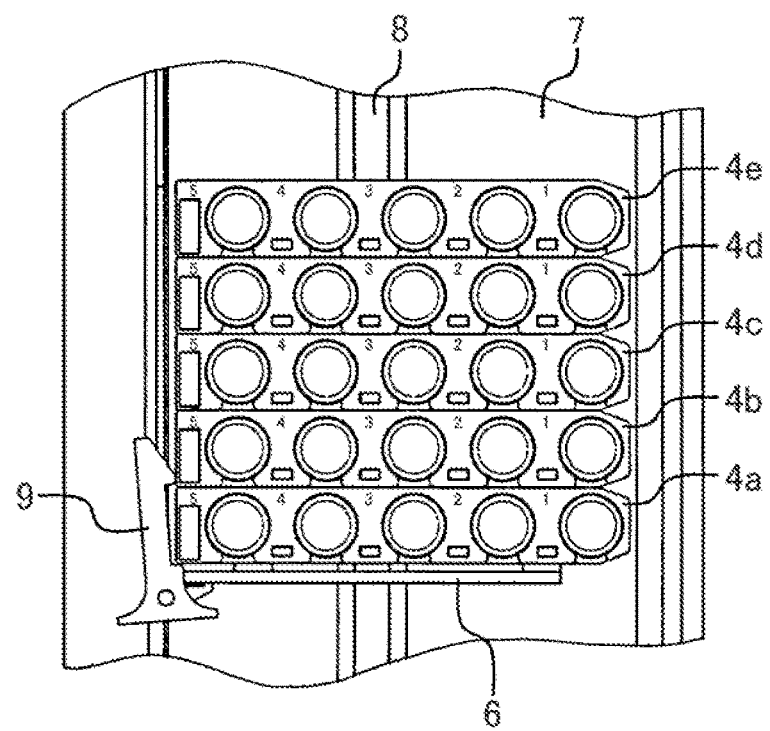
FIG. 11 is a view showing a state of transportation by the transport arm in the case where a plurality of specimen racks is arranged closely with each other on the transport path.

FIG. 11 is a view illustrating a state where the transport arm transports a plurality of specimen racks arranged closely with one another on the transport path. Referring to FIG. 11, the specimen racks are marked with 4*a* to 4*e*, respectively for the purpose of identification.

As FIG. 11 illustrates, when the transport arm 6 approaches the specimen racks 4*a* to 4*e*, the structural portion 9*c* of the rack lock member 9 comes in contact with the longitudinal end of the specimen rack 4*a* that is the closest to the transport arm 6, and is rotated counterclockwise when viewed from above. When the transport arm 6 further moves to the downstream side to reach the upstream side surface of the specimen rack 4*a*, an end of the structural portion 9*b* of the recess portion of the rack lock member 9, which is opposite the structural portion 9*a* comes in contact with a longitudinal end of the specimen rack 4*b* adjacent to the downstream side of the specimen rack 4*a*. As a result, the rack lock member 9 is no longer rotated. In this state, the longitudinal end of the specimen rack 4*a* is not engaged with the recess portion of the rack lock member 9 so that the relative position of the specimen rack 4*a* to the transport arm 6 is not brought into the fixed state (locked state). In the case where the specimen racks 4*a* to 4*e* are closely arranged, mutual interference among them suppresses generation of vibration to the transport direction. In the embodiment, explanations have been made about the five specimen racks 4*a* to 4*e* arranged closely with one another. The vibration to the transport direction may be suppressed so long as two or more specimen racks are closely arranged.

Figure 12:
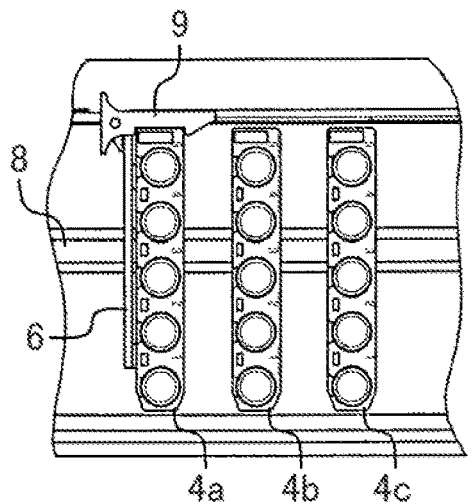
FIG. 12 is a view showing a state of transportation by the transport arm in the case where a plurality of specimen racks is installed leaving intervals between each other on the transport path.
Figure 13:
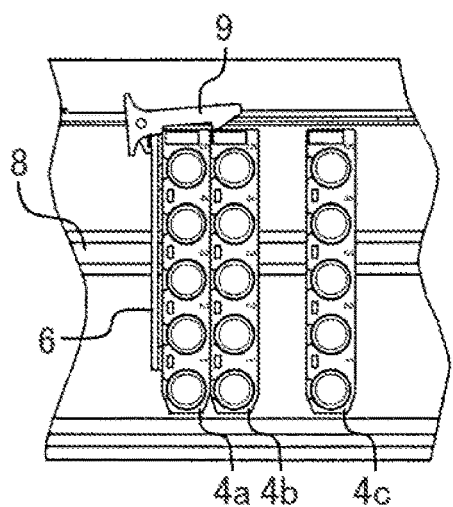
FIG. 13 is a view showing the state of transportation by the transport arm in the case where a plurality of specimen racks is installed leaving intervals between each other on the transport path.
Figure 14:
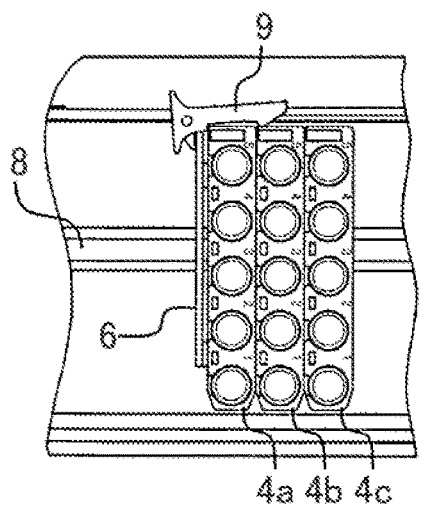
FIG. 14 is a view showing the state of transportation by the transport arm in the case where a plurality of specimen racks is installed leaving intervals between each other on the transport path.

FIG. 12 to FIG. 14 are views each illustrating the state where the transport arm transports the specimen racks arranged at intervals from one another on the transport path. In FIG. 11, the specimen racks are marked with 4*a* to 4*c*, respectively for the purpose of identification.

Referring to FIG. 12, when the transport arm 6 approaches the specimen rack 4*a* from the upstream side, the structural portion 9*c* of the rack lock member 9 comes in contact with a longitudinal end of the specimen rack 4*a*. The structural portion 9*c* slides on the end of the specimen rack 4*a* accompanied by the movement of the transport arm 6 to the downstream side. The rack lock member 9 is then rotated counterclockwise around the rotary shaft as the center. The structural portion 9*b* of the recess portion of the rack lock member 9 passes over the end of the specimen rack 4*a* when the transport arm 6 has moved up to the position which abuts on the specimen rack 4*a*. This brings the longitudinal end of the specimen rack 4*a* into engagement with the recess portion of the rack lock member 9. At this time, the structural portion 9*f* of the recess portion of the rack lock member 9 holds the upstream side surface of the specimen rack 4. The structural portion 9*b* of the recess portion of the rack lock member 9 holds the downstream side surface of the specimen rack 4*a*. Accordingly, the relative position of the specimen rack 4 to the transport arm 6 is brought into the fixed state (locked state) to prevent the specimen rack 4 from vibrating in the transport direction.

As FIG. 13 illustrates, when the transport arm 6 further moves to the downstream side to bring the specimen rack 4*a* into close to the second specimen rack 4*b* from the transport arm 6, the structural portion 9*c* of the rack lock member 9 comes in contact with the longitudinal end of the specimen rack 4*b* similar to the case of the specimen rack 4*a*. Accompanied by the movement of the transport arm 6 to the downstream side, the structural portion 9*c* slides on an end of the specimen rack 4*b*. The rack lock member 9 is then rotated counterclockwise around the rotary shaft as the center. When the transport arm 6 further moves to the downstream side to bring the downstream side surface of the specimen rack 4*a* into contact with the upstream side surface of the specimen rack 4*b*, the end of the structural portion 9*b* of the recess portion of the rack lock member 9 at the side opposite the structural portion 9*a* is brought into contact with the longitudinal end of the specimen rack 4*b*. As a result, the rack lock member 9 is no longer rotated. In the above-described state, as the longitudinal end of the specimen rack 4*a* is not engaged with the recess portion of the rack lock member 9, the relative position of the specimen rack 4*a* to the transport arm 6 is not brought into the fixed state (locked state). However, if the specimen racks 4*a*, 4*b* are closely arranged, the mutual interference suppresses generation of the vibration in the transport direction.

As FIG. 14 illustrates, the transport arm 6 further moves to the downstream side to bring the downstream side surface of the specimen rack 4*b* into contact with the upstream side surface of the third specimen rack 4*c* from the transport arm 6. In this state, as the longitudinal end of the specimen rack 4*a* is not engaged with the recess portion of the rack lock member 9, the relative position of the specimen rack 4*a* to the transport arm 6 is not brought into the fixed state (locked state). However, if the specimen racks 4*a* to 4*c* are closely arranged, the mutual interference suppresses generation of the vibration in the transport direction.

The specimen rack transferring device 200 according to the embodiment transfers the specimen rack 4 which allows loading of the plurality of specimen containers 5 each containing the specimen in an arrangement in the longitudinal direction, and include the transport path 201 for transferring the specimen rack 4 in the direction orthogonal to the longitudinal direction, the transport arm 6 for pushingly advancing the specimen rack 4 from the upstream side to the downstream side of the transport path 201, and the rack lock mechanism attached to the transport arm 6 for fixing the relative position of the specimen rack 4 to the transport arm 6 at least in the transport direction. This makes it possible to suppress the vibration of the specimen rack in the transport process.

The recess portion of the rack lock member 9 is indirectly engaged with the side surface of the end of the specimen rack 4 in the longitudinal direction accompanied by the movement of the transport arm 6. This eliminates the use of power or mechanisms for separately operating the rack lock member 9 independently. The vibration of the specimen rack 4 can be suppressed by the simple configuration.

In the embodiment, it has been described as an example that the recess portion of the rack lock member 9 is engaged with the longitudinal end of the specimen rack 4 to suppress the vibration of the specimen rack 4 in the transport direction. It is also possible to bring the recess portion of the rack lock member 9 and the upper surface of the specimen rack 4 into engagement with each other to suppress the vibration of the specimen rack 4. In this case, the rotary shaft of the base member 10 is horizontally set to make the rack lock member 9 vertically rotatable so that the recess portion of the rack lock member 9 is directed downward. The rotary shaft may be directed along the operating direction of the transport arm 6, or directed orthogonally to the operating direction.

Second Embodiment

A second embodiment of the present invention will be described in detail referring to FIG. 15 to FIG. 20. In the drawings, the similar members to those described in the first embodiment will be designated with the same codes, and explanations thereof, thus will be omitted.

In the embodiment, the rack lock mechanism grips the specimen rack from both longitudinal ends to suppress the vibration of the specimen rack with respect to the transport arm in the transport direction.

Figure 15:
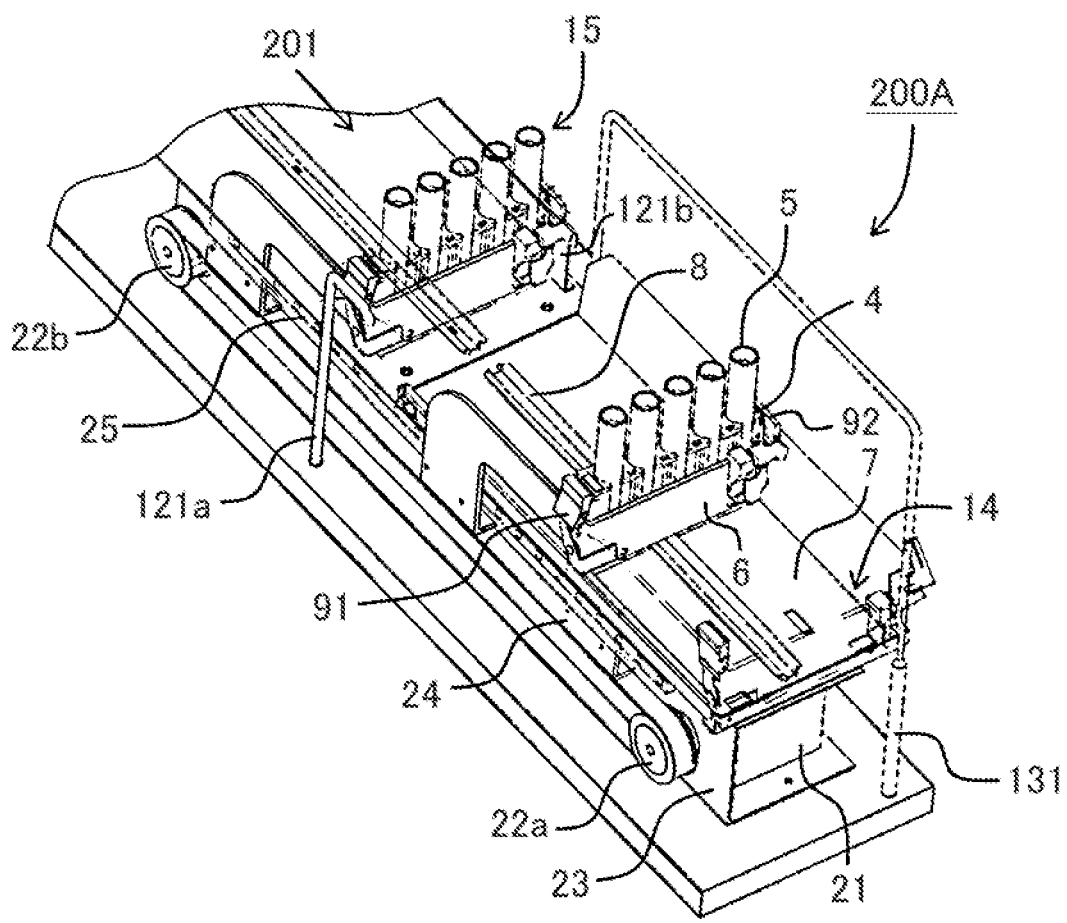
FIG. 15 is a perspective view showing by extracting a specimen rack transferring device according to a second embodiment.

FIG. 15 is a perspective view of an extracted specimen rack transferring device according to the embodiment. FIG. 15 illustrates the state where the specimen rack is in the transport process.

Referring to FIG. 15, a specimen rack transferring device 200A transfers the specimen rack 4 which allows loading of one or more specimen containers 5 each containing the specimen in an arrangement in the longitudinal direction, and include the transport path 201 for transferring the specimen rack 4 in the direction orthogonal to the longitudinal direction, the transport arm 6 for pushingly advancing the specimen rack 4 from the upstream side to the downstream side of the transport path 201, and the rack lock mechanism attached to the transport arm 6 for fixing the relative position of the specimen rack 4 to the transport arm 6 at least in the transport direction.

The transport arm 6 moves from the transport operation-starting position 14 indicated by the two-dotted chain line to the transport-ending position to pushingly advance the specimen rack on the transport path in the direction orthogonal to the one in which the plurality of specimen containers 5 are arranged in the longitudinal direction of the specimen rack 4 (that is, the direction orthogonal to the longitudinal direction). The specimen rack 4 set on the rack tray 7 is pushed by the transport arm 6 to be loaded into the device (specimen rack transporting section 2) from the rack tray 7.

Figure 16:
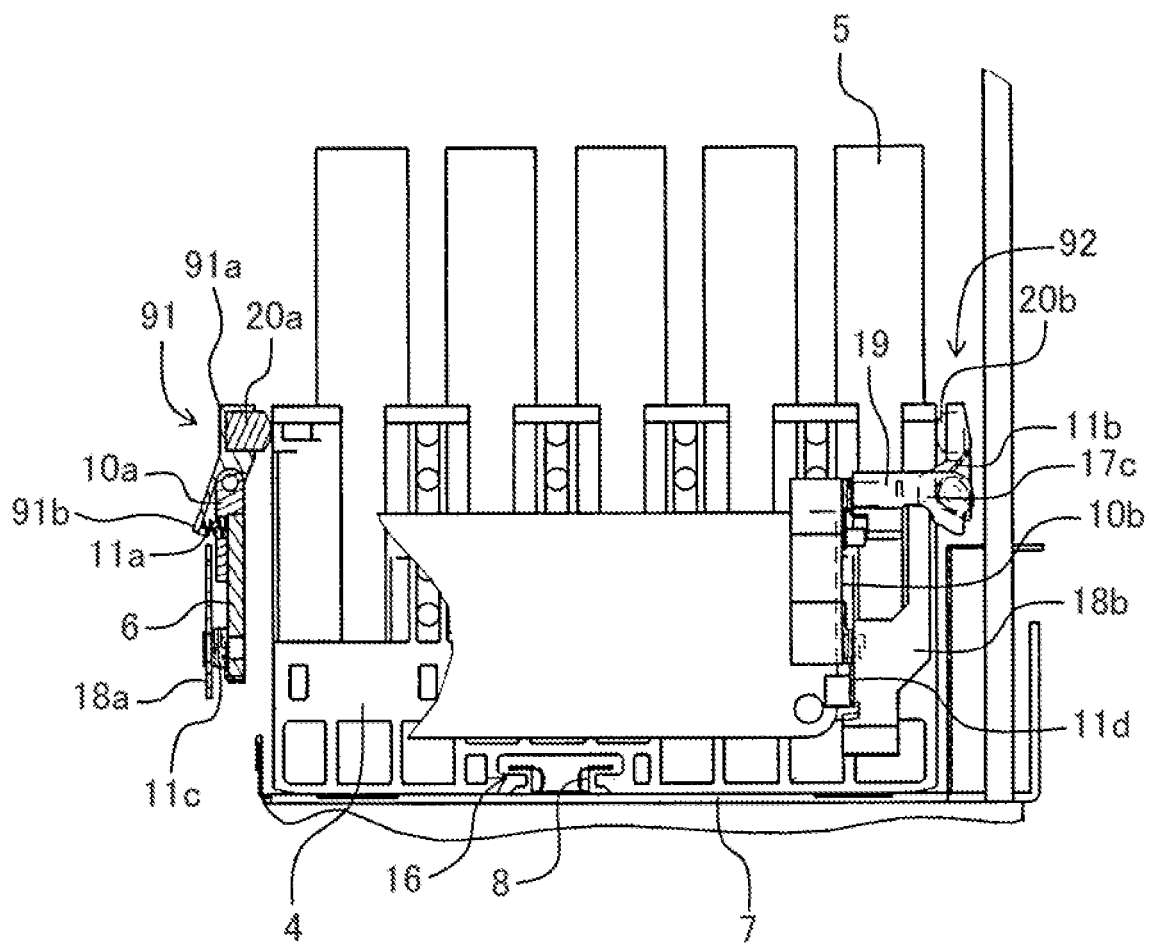
FIG. 16 is a side view showing by extracting a transport arm together with a peripheral configuration and is a view in viewing the transport arm from an upstream side of a transport path.
Figure 17:
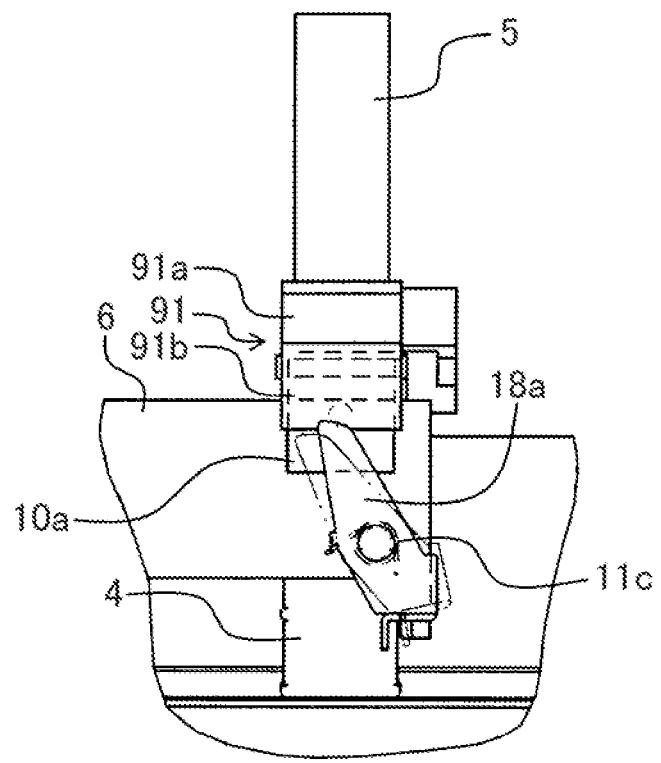
FIG. 17 is a side view enlargingly showing by extracting a rack lock mechanism provided at the transport arm and is a side view in viewing from the left side in a travelling direction in a transport operation of the transport arm.
Figure 18:
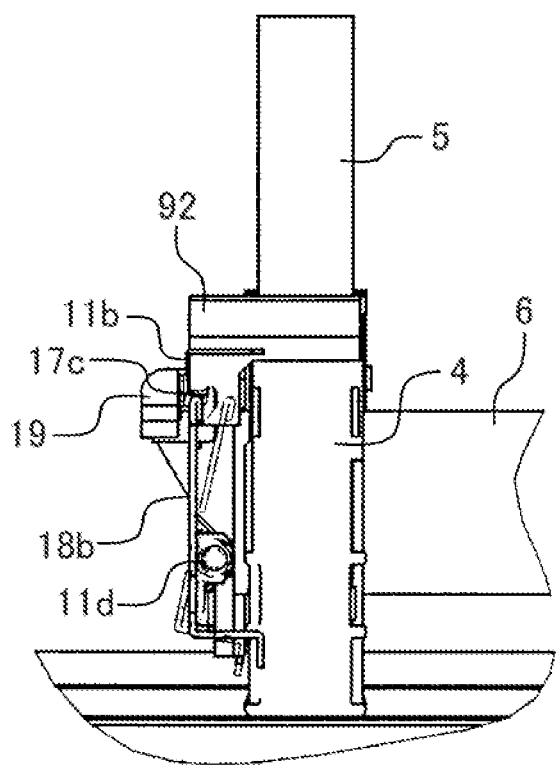
FIG. 18 is a side view enlargingly showing by extracting the rack lock mechanism provided at the transport arm and is a side view in viewing from the right side in the travelling direction in the transport operation of the transport arm.

FIG. 16 is a side view of an extracted transport arm and its periphery when the transport arm is viewed from the upstream side of the transport path. FIG. 17 and FIG. 18 are side views each illustrating an enlarged part of an extracted rack lock mechanism attached to the transport arm. FIG. 17 is a side view of the transport arm in the transport process when viewed from the left side in the advancing direction. FIG. 18 is a side view of the transport arm when viewed from the right side in the advancing direction. FIG. 18 is a partial perspective view of a part of the rack lock member 92.

As FIG. 16 illustrates, the transport arm 6 includes rack lock members 91, 92 at the left and right sides, respectively in the advancing direction.

A base member 10a holds the rack lock member 91 rotatably with respect to the transport arm 6. The rack lock member 91 includes a structural portion 91a at the upper section of the rotary shaft, and a structural portion 91b at the lower section of the rotary shaft, which are rotatably held with respect to the rotary shaft set along the advancing direction. The rack lock member 91 is configured to be bent outward at the position of the rotary shaft. When the structural portion 91a moves in a swinging motion to the side of the specimen rack 4, the structural portion 91b extends outward. When the structural portion 91b moves in a swinging motion to the side of the specimen rack 4, the structural portion 91a extends outward. The structural portion 91a of the rack lock member 91 at the side of the specimen rack 4 is provided with a frictional member 20a which faces the longitudinal end of the specimen rack 4. The rack lock member 91 is urged clockwise by an elastic body 11a when viewed from behind in the advancing direction. As the rack lock member 91 is rotated, the longitudinal end of the specimen rack 4 is pressed by the frictional member 20a.

A stopper member 18a is disposed below the rack lock member 91 of the transport arm 6, which is rotatable in the same direction as the advancing direction of the transport arm. In the state where the structural portion 91b of the rack lock member 91 is moving to the side of the specimen rack 4 against the urging force applied by the elastic body 11a, the stopper member 18a moves to the position adjacent to the outer side of the structural portion 91b to regulate the rotation of the rack lock member 91 to the side of the specimen rack 4. In this state, the frictional member 20a of the rack lock member 91 is fixed to the position separated from the specimen rack 4 (released state).

The stopper member 18a is urged clockwise by an elastic body 11c in a view of FIG. 17. Accompanied by the movement of the transport arm 6, a convex portion at the lower end of the stopper member 18a comes in contact with the specimen rack 4, and is rotated counterclockwise to release the state where the rack lock member 91 is regulated by the stopper member 18a. As the regulated state is released by the rotation of the stopper member 18a, the rack lock member 91 is rotated so that the frictional member 20a abuts on the specimen rack 4 (locked state).

An auxiliary base member 19 attached to a base member 10b rotatably holds the rack rock member 92 with respect to the transport arm 6. Similar to the rack lock member 91, the rack lock member 92 is rotatably held with respect to the rotary shaft set along the advancing direction. The rack lock member 92 is provided with a frictional member 20b at the side of the specimen rack 4, which faces the longitudinal end of the specimen rack 4. The rack lock member 92 is urged counterclockwise by an elastic body 11b when viewed from behind in the advancing direction. As the rack lock member 92 rotates, the longitudinal end of the specimen rack 4 is pressed by the frictional member 20b.

A stopper member 18b rotatable in the same direction as the advancing direction of the transport arm is disposed below the rack lock member 92 of the transport arm 6. The rack lock member 92 includes a stopper structure 17c on a side of the rotary shaft. In the state where the rack lock member 92 is separated from the specimen rack 4 against the urging force applied by the elastic body 11b, the stopper member 18b interferes with the stopper structure 17c to regulate the rotation of the rack lock member 92 to the side of the specimen rack 4. In this state, the frictional member 20b of the rack lock member 92 is fixed to the position separated from the specimen rack 4 (released state).

The stopper member 18b is urged counterclockwise by an elastic body 11d in the view of FIG. 18. Accompanied by the movement of the transport arm 6, a convex portion at the lower end of the stopper member 18b comes in contact with the specimen rack 4, and is rotated clockwise. The interference of the stopper member 18b no longer interferes with the stopper structure 17c of the rack lock member 92 so that the regulation is released. As the regulation is released by the rotation of the stopper member 18b, the rack lock member 92 is rotated to make the frictional member 20b in abutment on the specimen rack 4 (locked state). That is, the force generated between the transport arm 6 on the move and the specimen rack 4 brings the rack lock mechanism into the locked state where the relative position of the specimen rack 4 to the transport arm 6 is fixed.

In the embodiment, the push spring and the torsion spring have been described as an exemplified case of the elastic bodies 11a, 11b, 11c, 11d. However, other elastic bodies such as pull springs and rubbers may be used in a non-restrictive manner.

Each of the frictional members 20a, 20b respectively attached to the rack lock members 91, 92 is the member with high friction coefficient such as rubber. Those members grip the specimen rack 4 from both sides in the longitudinal direction by rotations of the rack lock members 91, 92 to the side of the specimen rack 4. Similar to the first embodiment, the rack lock members 91, 92 move to the transport-ending position 15 while holding the gripped state.

Figure 19:
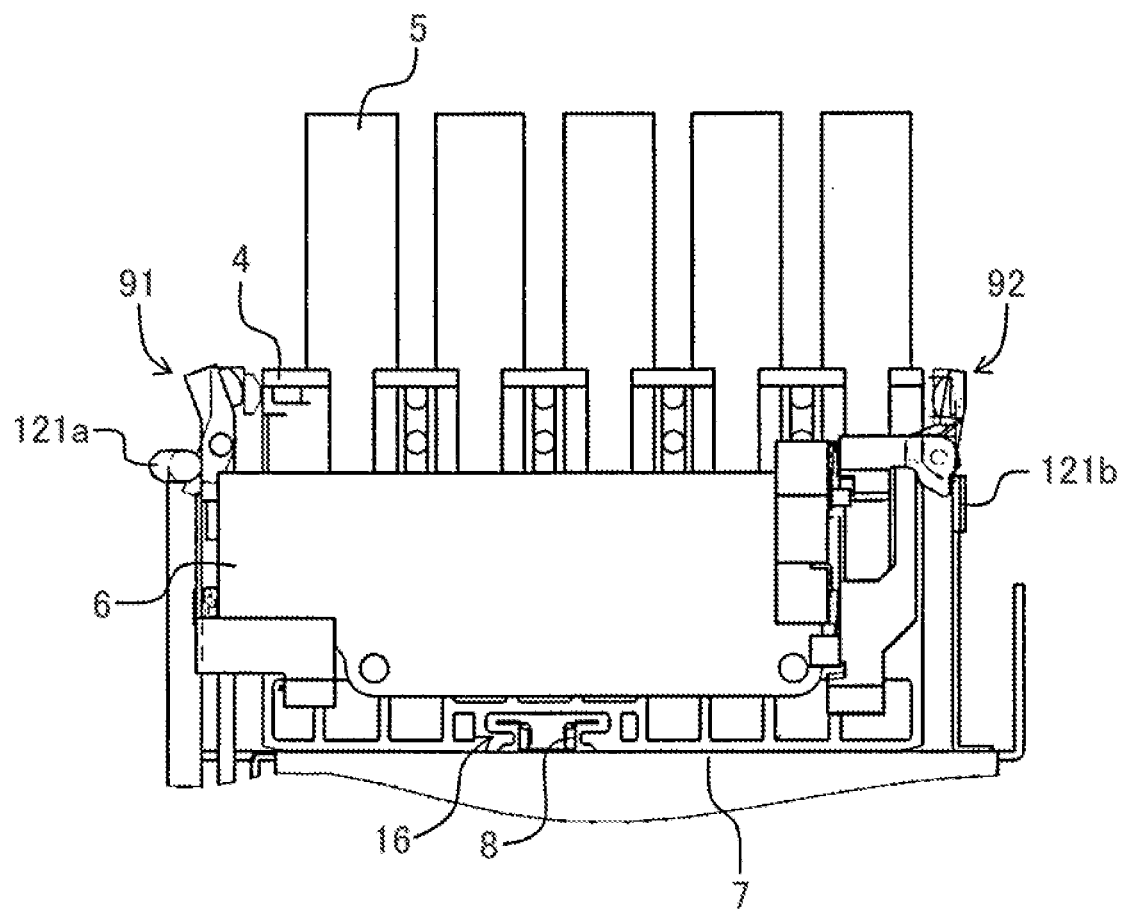
FIG. 19 is a side view in viewing the transport arm at a transport-ending position from the upstream side.

FIG. 19 is a side view of the transport arm at the transport-ending position when viewed from the upstream side.

As FIG. 19 illustrates, lock releasing members 121a, 121b at the transport-ending position 15 are fixed in an arrangement like an inverted V shape when viewed from above. The rack lock member 91 at the left side in the advancing direction comes in contact with the lock releasing member 121a accompanied by the movement of the transport arm 6, and is rotated counterclockwise when viewed from the upstream side so that the frictional member 20a is separated from the specimen rack 4. The rack lock member 92 at the right side in the advancing direction comes in contact with the lock releasing member 121b accompanied by the movement of the transport arm 6, and is rotated clockwise when viewed from the upstream side so that the frictional member 20b is separated from the specimen rack 4. The above-described operations release the gripped state of the specimen rack 4.

When the contact between the specimen rack 4 and the convex portions at the lower ends of the stopper members 18a, 18b is released by the transport arm 6 moving from the transport-ending position 15 to the transport operation-starting position 14, or the transport of the specimen rack 4 by the subsequent transport mechanism provided on the specimen rack transporting section 2, the stopper members 18a, 18b are rotated by the elastic bodies 11c, 11d in the urging direction, respectively, and interfere with the structural portion 91b of the rack lock member 91, and the stopper structure 17c of the rack lock member 92. The rack lock members 91, 92 are fixed at the positions separated from both ends of the specimen rack 4. The transport arm 6 then moves to the transport operation-starting position 14 while holding the fixed position.

Figure 20:
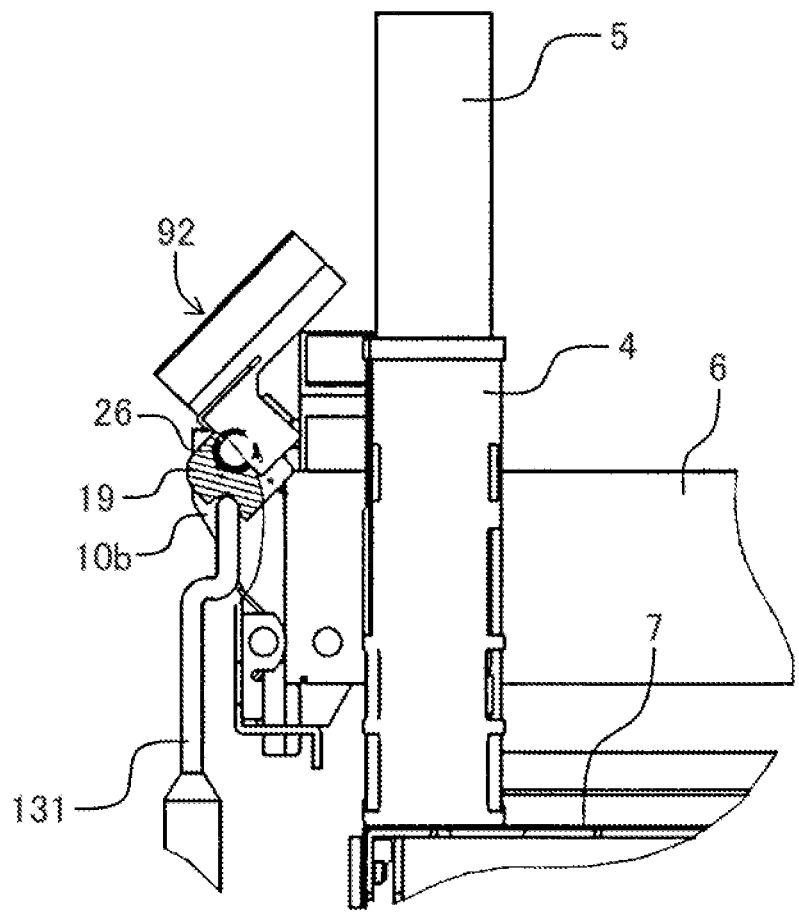
FIG. 20 is a side view in viewing the transport arm at a transport operation-starting position from the right side in the travelling direction.

FIG. 20 is a side view of the transport arm at the transport operation-starting position when viewed from the right side in the advancing direction.

As FIG. 20 illustrates, the auxiliary base member 19 of the rack lock member 92 at the right side in the advancing direction is rotatably attached to the base member 10a in the same direction as the advancing direction of the transport arm. The auxiliary base member 19 is urged clockwise by an auxiliary elastic body 26 in the view of FIG. 20. Accompanied by the movement of the transport arm 6 to the transport operation-starting position 14, the auxiliary base member 19 comes in contact with an interference avoiding member 131 fixed to the device base, and is rotated counterclockwise. The rotation of the auxiliary base members 19 flips up the rack lock member 92 integrally.

When the transport arm 6 is located at the transport operation-starting position 14, the rack lock member 91 at the left side in the advancing direction does not interfere with the flow line of the rack tray 7 in the attachment/detachment process. Accompanied by the movement of the transport arm 6 to the transport operation-starting position 14, the rack lock member 92 at the right side in the advancing direction is rotatably retracted to the position which does not interfere with the flow line of the rack tray 7 in the attachment/detachment process.

In the embodiment, if the plurality of specimen racks 4 are set on the rack tray 7 either closely with one another or at intervals from one another, the specimen rack 4 which is the closest to the transport arm 6 is only held by the rack lock members 91, 92. The difference in the state of the respective specimen racks 4 set on the rack tray 7 does not influence the lock structure.

Other structures are similar to those described in the first embodiment.

The above-configured embodiment also provides effects similar to those derived from the first embodiment.

SUPPLEMENTARY DESCRIPTION

The present invention is not limited to the above-described embodiments, but may include various modifications and combinations without departing from the scope and spirit of the invention. The present invention is not limited to the one with all the structures described in the embodiments, but includes the structure which has been partially omitted.

For example, instead of the use of the rack lock members 91, 92 as described in the second embodiment, it is possible to use the member having the recess portion to be engaged with the end of the specimen rack 4 as described in the first embodiment.

LIST OF REFERENCE SIGNS

1: Specimen rack loading section
2: Specimen rack transporting section
3: Analyzing section
4, 4a to 4e: Specimen rack
5: Specimen container
6: Transport arm
7: Rack tray
8: Guide rail
9: Rack lock member
9a to 9f: Structural portion
10, 10a, 10b: Base member
11, 11a to 11d: Elastic body
12, 121a, 121b: Lock releasing member 13, 131: Interference avoiding member
14: Transport operation-starting position
15: Transport-ending position
16: T-shaped recess portion
17a to 17c: Stopper structure
18a, 18b: Stopper member
19: Auxiliary base member
20a, 20b: Frictional member
21: Motor
22a, 22b: Pulley
23: Structural member
24: Belt
25: Guide member
26: Auxiliary elastic body
91, 92: Rack lock member
91a, 91b: Structural portion
100: Automatic analyzer
200, 200A: Specimen rack transferring device
201: Transport path

The invention claimed is:

1. A specimen rack transferring device transferring a specimen rack which places a plurality of specimen containers accommodating specimens, in a side-by-side manner in a longitudinal direction and can carry the plurality of specimen containers, the specimen rack transferring device comprising:
 a transport path for transferring the specimen rack in a direction orthogonal to the longitudinal direction;
 a transport arm pushingly advancing the specimen rack from an upstream side toward a downstream side of the transport path, and
 a rack lock mechanism provided at the transport arm and fixing at least a relative position of the specimen rack in a transport direction with respect to the transport arm, wherein the rack lock mechanism is in a release state of not fixing the relative position of the specimen rack with respect to the transport arm at a position where the transport arm is spaced away with respect to the specimen rack on the upstream side of the transport path, and wherein when the transport arm moves to a position abutting against the specimen rack from the upstream side of the transport path, the rack lock mechanism is brought into a lock state of fixing the relative position of the specimen rack with respect to the transport arm,
 wherein the rack lock mechanism is brought into a lock state of fixing the relative position of the specimen rack with respect to the transport arm due to force which is produced between the transport arm and the specimen rack according to movement of the transport arm.

2. The specimen rack transferring device according to claim 1,
 further comprising a lock releasing mechanism which is provided at a transport-ending position of a downstream side end portion of the transport path and when the transport arm moves to the transport-ending position, acts on the rack lock mechanism to make a release state of not fixing the relative position of the specimen rack with respect to the transport arm.

3. The specimen rack transferring device according to claim 1,
 comprising a rack tray which is configured to be capable of carrying one or more specimen racks and provided detachably onto the transport path.

4. The specimen rack transferring device according to claim 3,
 further comprising a rack lock retracting mechanism which is provided at a transport operation-starting position of an upstream side end portion of the transport path and when the transport arm moves to the transport operation-starting position, acts on the rack lock mechanism to retract the rack lock mechanism from a movement path in attachment/detachment of the rack tray with respect to the transport path.

5. The specimen rack transferring device according to claim 1,
 comprising a rack tray which is configured to be capable of carrying one or more specimen racks and provided detachably onto the transport path.

6. The specimen rack transferring device according to claim 3,
 further comprising a guide rail which is provided at the transport path so as to extend along a transport direction of the specimen rack and slidably engages the specimen rack to guide movement of the specimen rack in the transport direction.

7. An automatic analyzer comprising:
 a specimen rack loading section loading a specimen rack carrying specimen containers in which specimens are accommodated;
 a specimen rack transporting section transporting the specimen rack from the rack loading section to an analyzing section;
 the analyzing section performing analysis of the specimens, and
 the specimen rack transferring device according to claim 1, provided at the specimen rack loading section and transferring the specimen rack loaded into the specimen rack loading section to the specimen rack transporting section.

* * * * *